United States Patent [19]
Richards

[11] 3,993,887
[45] Nov. 23, 1976

[54] STUD AND METHOD OF WELDING SAME TO A BOILER TUBE

[75] Inventor: Peter S. Richards, Portland, Oreg.

[73] Assignee: TRW Inc., Cleveland, Ohio

[22] Filed: Sept. 19, 1974

[21] Appl. No.: 507,450

Related U.S. Application Data

[63] Continuation of Ser. No. 327,312, Jan. 29, 1973, abandoned.

[52] U.S. Cl. .................................. 219/99; 219/107
[51] Int. Cl.² ............................................. B23K 9/20
[58] Field of Search ........................ 219/98, 99, 107

[56] References Cited
UNITED STATES PATENTS

| | | | |
|---|---|---|---|
| 2,708,129 | 5/1955 | Kelemen et al. ....................... | 219/98 |
| 3,541,294 | 11/1970 | Jerdonek .............................. | 219/99 |
| 3,671,710 | 6/1972 | Coombs ................................ | 219/99 |

Primary Examiner—J. V. Truhe
Assistant Examiner—N. D. Herkamp
Attorney, Agent, or Firm—Allen D. Gutchess, Jr.

[57] ABSTRACT

Boiler tube studs and a method of welding the studs to boiler tubes are provided. Boiler tubes have a multiplicity of studs welded thereto and extending outwardly therefrom, with refractory material placed over the studs and held thereon to protect the boiler tubes and to prevent deterioration and wear thereof. The studs wear down over a period of time and new studs have to be welded to the tubes periodically. In accordance with the invention, the new studs are welded directly on the worn studs or nubbins without the necessity of grinding down or otherwise removing or partially removing the worn studs. The new studs have recesses in the ends to facilitate being positioned on the old studs in proper welding position and to improve the welding operation.

5 Claims, 4 Drawing Figures

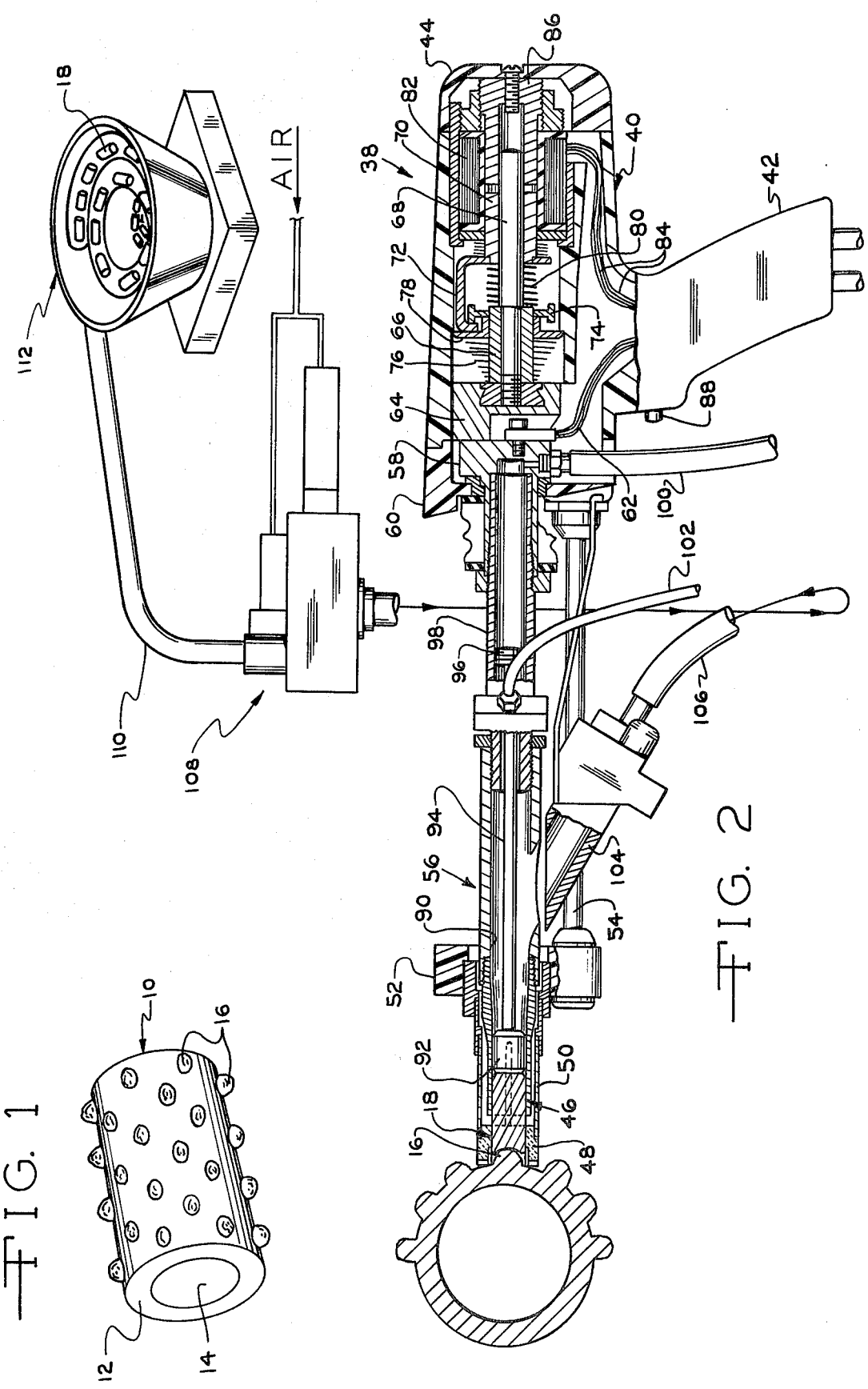

STUD AND METHOD OF WELDING SAME TO A BOILER TUBE

This is a continuation of application Ser. No. 327,312 filed Jan. 29, 1973, now abandoned.

This invention relates to a boiler tube stud and to a method of welding studs to boiler tubes.

In large boilers, boiler tubes are positioned to be in heat-exchange relationship with hot gases supplied to the boiler. In one common design, the boiler tubes are arranged in helical patterns with the adjacent wraps of tubes in contiguous relationship to form a large cylindrical chamber or cyclone, a number of which are in a given boiler system. A burner is located near one end of the chamber and directs a combustible mixture into the chamber, with secondary air supplied tangentially at the burner end of the chamber to form a helical path of the combustible gases. The hot gases tend to attack and to erode the boiler tubes, particularly when the fuel is powdered coal, which has an abrasive action on the tubes. The erosion is particularly pronounced when crushed coal instead of pulverized coal is used, the former being several cents less in cost per ton than the latter. If holes result in the tubes, a major shut down and very expensive repair results. To prevent this, it has been common for the inner surfaces of the boiler tubes to be protected by a layer of refractory material. For this purpose, a multiplicity of studs are first welded to the surfaces of the tubes which form the inner surface of the cyclone; the refractory material is then placed thereover and held by the studs. With the boiler in operation, as the refractory wears away, primarily under the eroding influence of the coal dust, the refractory is replaced by coal slag so that the boiler tubes remain protected. However, as operation continues and the welded studs are further worn away, they become sufficiently short that they are no longer effective to hold the refractory or coal slag. At this point, the boiler must be shut down and the studs replaced. Typically, the stud replacement operation must be done every year after the second year of service, depending on the boiler age, size, fuel used, and load carried thereby. A typical chamber has about 250,000 studs, from 5 to 15 percent of which are replaced, a boiler typically requiring 17,000 studs.

Prior to being shut down, it is preferable to substitute gas for the coal fuel, if possible, to burn out as much of the slag as possible. After the boiler has been shut down for about 12 hours, a cleaning crew can then enter it and remove the remaining refractory material and slag from the tubes. Pneumatic chisels are employed to remove the bulk of the slag and the final cleaning is accomplished by sand blasting, by commercially-available needle scalers, or by high pressure water jets, with or without sand injection. Heretofore, it was common to remove or partly remove the eroded studs or nubbins prior to welding new studs in place. This was accomplished by grinding or by an arc-airing process, the former usually squaring off the ends of the worn studs and the latter substantially completely removing them.

In accordance with the invention, a new boiler tube stud is provided which has a recess in one end with a body of flux centrally located therein to facilitate welding of the stud directly on an existing nubbin. The stud can be welded to the nubbin without the necessity of removing the nubbin or any portion thereof if the nubbin is less than about three-eighths inch in length. Further, the recess in the stud improves weld consistency because it enables the new stud to be properly aligned with the old one and, at the same time, the weld pattern is improved. The recessed stud also substantially reduces the possibility of the stud slipping off the nubbin so that wear on the stud chuck and the ferrule tube is reduced. The welding rate also is increased since the new stud is quickly located on the old one, and operator fatigue is correspondingly reduced.

The new welding stud further has a sloping or truncated conical margin around the recess, between the edge of the recess and the outer body of the stud. This configuration of the stud particularly enables it to be fed in an oriented, automatic manner from a source of supply to the chuck of the welding tool.

It is, therefore, a principal object of the invention to provide an improved method of repairing boiler tubes.

Another object of the invention is to provide an improved method of applying new studs to boiler tubes, which method has the advantages outlined above.

A further object of the invention is to provide an improved stud to be welded to a boiler tube.

Yet a further object of the invention is to provide an improved boiler tube stud having a recess at one end thereof with a body of flux centrally located therein.

Still another object of the invention is to provide a boiler tube stud having a recess at one end with a margin therearound sloping rearwardly from the edge of the recess toward the outer surface of the body.

Other objects and advantages of the invention will be apparent from the following detailed description of a preferred embodiment thereof, reference being made to the accompanying drawings, in which:

FIG. 1 is a view in perspective of a section of a boiler tube to which new boiler tube studs are to be welded;

FIG. 2 is a somewhat schematic view of the boiler tube of FIG. 1 and a stud welding tool in section and a schematic representation of stud feeding means for the stud welding tool;

Figure 3:
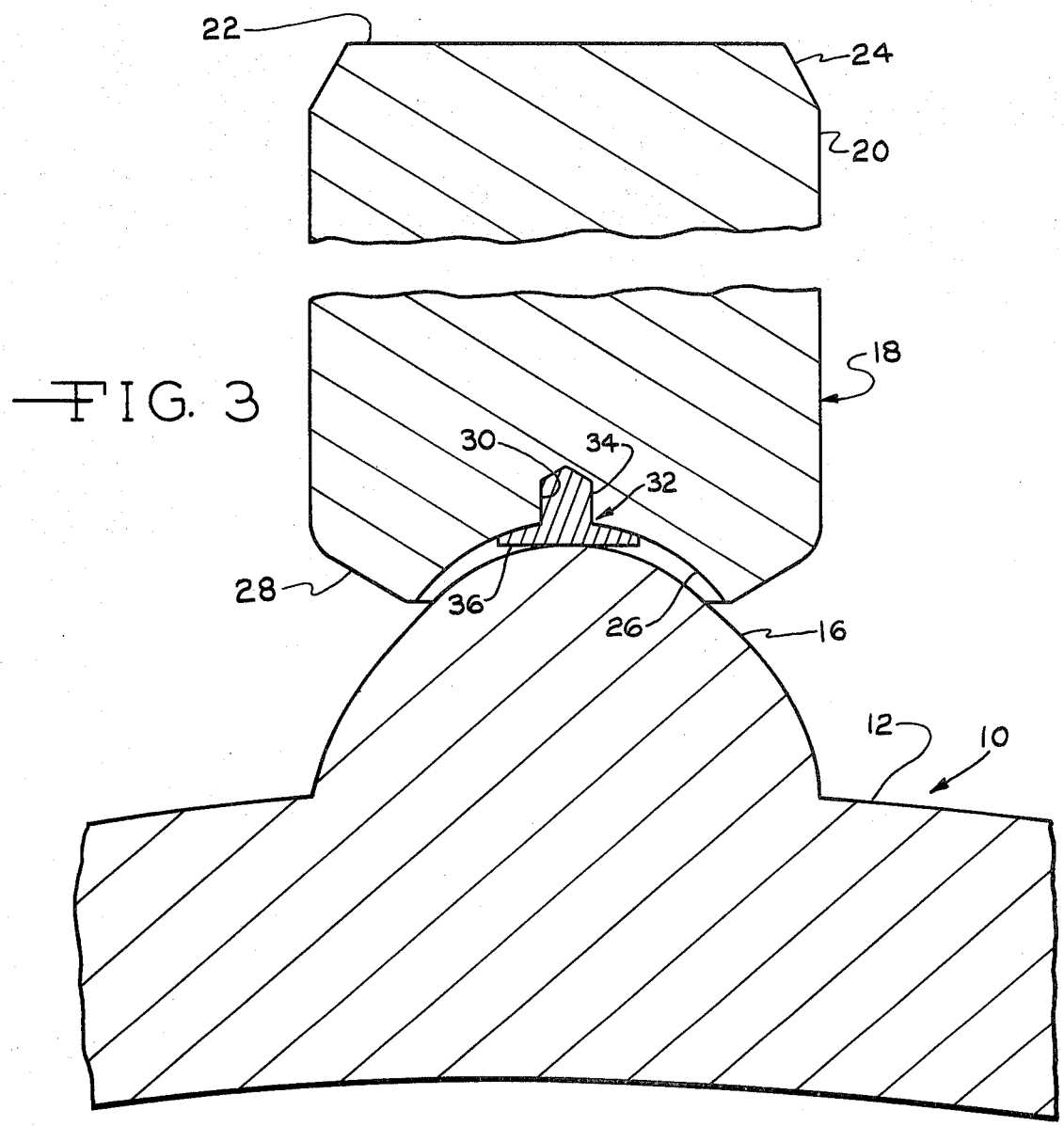
FIG. 3 is a greatly enlarged, fragmentary view in cross section of a boiler tube stud embodying the invention in a position to be welded to a nubbin of the boiler tube.

Referring to the drawings, and particularly to FIG. 1, a section of a worn boiler tube is indicated at 10. The boiler tube 10 includes a heavy wall 12 forming a fluid passage 14 therein, with the outer surface of the tube having a multiplicity of worn studs or nubbins 16. The tubes 10 are located in a helical pattern with adjacent wraps of the tubes being close together to form a large-diameter cylindrical chamber. The nubbins 16 are only on the inner portion, appproximately half, of the surface of the tube since only the inner surfaces, facing inwardly in the cylindrical chamber, are subjected to hot gases in the boiler. The hot gases are supplied by a large burner located at one end of the chamber formed by the tubes 10 with the burner emitting high-velocity, combustible gases into the cylinder. Secondary air is supplied tangentially into the cylinder near the burner to aid in combustion. The high-velocity gases move in a helical path down the cylinder, having a velocity in the order of 350 feet per second at the beginning where the secondary air enters. Further, when powdered coal is employed as the fuel, this has a tremendous abrasive effect, with the first 4 feet of the cylinder formed by the tubes typically being particularly subjected to wear, and even more so in the area where the tangential secondary air enters the cylindrical chamber.

The original boiler tubes and studs are covered with a highly refractory material, e.g., a chrome ore, which is eroded by the gases over a period of operation. As the refractory material erodes, it is replaced on the studs by coal slag, so that the tube wall 12 still remains protected. However, continued eroding of the studs occurs until they become sufficiently short that they are no longer effective to hold the refractory material, whether it be the chrome ore or coal slag. At this point, if the studs and refractory material are not replaced, the tube wall 12 will erode or be eaten away, and when a leak develops therein, a major and expensive repair results. Consequently, under optimum operating procedures, the boilers are turned off every 6 months and the refractory is thoroughly inspected. If refractory has been lost or the studs worn to less than three-eighths inch in length, the tube walls are rebuilt. Before shut down, a gaseous fuel preferably is employed in the burner for a period of time to cause the coal slag to be burned off the tubes as much as possible. After the boiler is shut down and cooled off, the remaining refractory material on the tubes is removed by the use of pneumatic chisels and then by sand blasting or by needle scalers. This also removes scale or refractory impurities from the remaining stud nubbins 16. Heretofore, the stud nubbins were commonly ground down to square off the ends or were completely removed by an arc-airing process. These additional steps were time consuming and the arc-airing process also tended to be dangerous because of possible damage to the boiler tubes.

Referring particularly to FIG. 3, a boiler tube stud indicated at 18 in accordance with the invention can be welded directly on the nubbin 16 quickly and efficiently without the nubbin being ground down or removed at all. The stud 18 includes an elongate cylindrical body 20 having a squared end 22 with a short taper 24 enabling the stud to be more easily inserted into a chuck of a stud welding tool. The other end of the stud 18 has a centrally located recess 26 preferably of a concave configuration and of a predetermined, constant radius throughout. The diameter or maximum width across the recess 26 preferably is from one-half to three-fourths, preferably about two-thirds, of the diameter or maximum width across the stud body 20. An annular margin 28 thereby is formed between the peripheral edge of the recess 26 and the outer surface of the body 20. This margin slopes rearwardly from the recess toward the outer surface and is generally of a truncated conical shape. The margin 28 forms an angle of 20° to 35°, and preferably 25° to 30°, with a plane perpendicular to the longitudinal extent of the stud 18. This margin and angle are important because they enable the studs to be automatically fed in an oriented manner from a source to a stud welding tool, as will be discussed subsequently.

The depth of the recess 26 is from 0.050 to 0.080 inch and preferably 0.060 to 0.070 inch. The depth is important because too shallow a recess will not enable the stud to be properly oriented on and welded to the nubbin 16, while an excessive depth will leave a void in the center of the stud after it has been welded to the nubbin. A second, central recess 30 is formed in the recess 26 and a body 32 of flux is held in the recess 30. The body 32 includes a projecting portion 34 which fills the recess 30 and a squared portion 36 which preferably is in contact with the nubbin 16 when the stud 18 is in proper welding position. It is not essential, however, that the flux body 32 be in contact with the nubbin 16 since a proper weld will result even if edge portions of the recess 26 are in contact with the nubbin 16. The portion 36 of the flux body 32 is squared off and relatively flat so as not to project any more than necessary from the surface of the recess 26. The more the flux body 32 would project, the deeper the recess would have to be, since the body 32 should be well back of a plane through the peripheral edge of the recess.

It will be seen that the recess 26 enables the stud 18 to be readily and properly located on the nubbin 16. The recess 26 then substantially reduces the posibility that the stud 18 will slip off the nubbin 16 which correspondingly reduces damage and wear to the ferrule grip and the chuck. The proper positioning of the stud 18 also improves weld consistency and the weld pattern. This, in turn, assures a more dense concentration of studs on the tubes, resulting in superior heat sink capacities and improved refractory anchor areas. The welding rate can also be substantially increased since the operator can readily position the stud on the nubbin, with operator fatigue concomitantly being reduced.

After the stud is properly positioned on the nubbin 16, it is welded thereto by a drawn-arc, end-welding technique by means of a welding tool indicated at 38 in FIG. 2. The tool 38 can be of a number of suitable types. When the stud 18 is welded to the nubbin 16 by the drawn-arc technique, the tool 10 includes means for retracting the stud from the nubbin, means for holding the stud in the retracted position for a predetermined period, and means for moving the stud toward and against the nubbin at the end of the predetermined period. A pilot arc is established between the stud and the nubbin as the stud is retracted, and a main welding arc is established between the stud and the nubbin before the stud is plunged back against the nubbin.

The tool 38 includes a main body or housing 40 of suitable dielectric material and having an integral pistol grip 42 and a separable rear end cap 44. A chuck 46 at the front of the tool 38 holds the stud 18 during the welding operation. A ferrule 48 is positioned on the outer surface of the wall 12, around the nubbin 16, the ferrule being held in a ferrule tube or grip 50 attached to a welding foot 52 which, in turn, is adjustably supported by two legs 54 extending from the tool housing 40 and adjustable longitudinally with respect thereto, as is well known in the art. A new one of the ferrules 48 is employed each time another one of the studs 18 is to be welded, with the ferrules being subsequently removed prior to the application of new refractory material over the newly welded studs.

The chuck 46 is connected through a chuck leg assembly 56 to a cable clamp 58 located at the forward portion of the tool housing 40 behind a front wall 60 thereof. Welding current is supplied to the cable clamp 58 through a flexible main welding cable 62 which applies welding current to the chuck 46 and the stud 18 carried thereby. A rear cable clamp part 64 is located behind the clamp 58 and is suitably connected to a lift rod 66 having a guide rod 68 extending rearwardly through a movable core 70. A lifting hook 72 is attached to the movable core 70 and is positioned to engage a lifting ring 74 when moved rearwardly by the core 70. The ring 74 has an inner diameter slightly exceeding the outer diameter of the lift rod 66 and the ring 44 is maintained in a perpendicular position relative to the rod by a return or plunge spring 76, a stop plate 78, and a lifting ring spring 80. The return or plunge spring 76 moves the rod 66 toward the workpiece when the core 70 is released, to provide the plunge stroke for the stud. When the lift ring 74 is perpendicular to the rod 66, the ring is free of the lift rod 66 which can move therethrough so as to retract when the stud and the chuck are moved from an extended position to a slightly retracted, initial welding position, as shown in FIG. 3, with the stud 18 against the nubbin 16. The initial welding position will vary somewhat for variations in the length of the nubbins 16 and with possible small variations in the length of the studs. When the core 70 moves to the rear, the lifting hook 72 engages the lifting ring 74, and the ring is pulled to a canted position in which it engages the lifting rod 66 and retracts it a predetermined distance to a fully retracted position. With this arrangement, then, the stud 18 will be retracted a constant predetermined distance from the nubbin during the welding operation, even though the lengths of the nubbin and stud may differ from the lengths of other nubbins and studs.

The movable core 70 is retracted when current is supplied to a lifting and holding coil 82 through suitable leads 84. The rearward movement of the core 70, which determines the extent of the retraction of the stud 18, is limited by an adjustable core piece 86. This piece is manually longitudinally adjustable relative to the cap 44 and the core 82 by a suitable screw and locking nut arrangement.

The operation of the tool 38 is controlled by a suitable control circuit (not shown). After the stud is in engagement with the nubbin, a trigger 88 of the tool is pressed to close contacts (not shown) to supply current from a suitable source through the cable 62 and the stud 18. Substantially at the same time, the coil 82 is energized to cause the core 70 to retract the chuck leg 56 and the chuck 46. An arc is drawn between the stud and the nubbin 16 as the stud retracts, with a pilot arc preferably first drawn and then a subsequent, heavier welding arc. The welding arc causes the welding end of the stud 18 to melt and similarly causes an end portion of the nubbin 16 to melt. When power to the coil 82 is subsequently shut off, the plunge spring 80 then moves the chuck leg 56, the chuck 46, and the stud 18 back toward the nubbin. The welding arc between the two preferably persists until they come into contact to assure that the molten portions of the nubbin and stud remain molten until the stud and the nubbin are in engagement. The pools of molten metal are thereby united to complete the weld.

After the weld is completed, the tool 38 and the chuck 46 are pulled away from the now-welded stud. Before another welding cycle can commence, another one of the studs 18 must be inserted in the chuck 46 and another one of the ferrules 48 inserted in the ferrule tube 50. The latter can be done by hand but the studs 18 are preferably automatically supplied to the chuck. To supply studs automatically to the chuck 46, the chuck leg 56 has a loading chamber 90 formed at the rear of the chuck 46 in communication therewith. When one of the studs 18 is in the loading chamber 90, it is pushed forwardly into welding position in the chuck 46 by means of a stud plunger 92 which is connected by a piston rod 94 to a piston 96. The piston 96 reciprocates in an air cylinder 98, being driven forwardly to move the stud into the chuck when air is supplied to a rear line 100, with the piston 96 and the plunger 92 remaining in the forward position to back up the stud during the welding cycle. After the weld is completed, air can be supplied to a forward line 102 to retract the plunger 92 and enable another stud to be supplied to the loading chamber 90.

The studs can be supplied automatically, one at a time, through a supply inlet 104, suitably supported by the legs 54 and communicating with a supply tube 106, through which the studs are blown from an escapement 108. This escapement can be of many suitable types, including the type shown in U.S. Pat. No. 3,339,799. Studs are supplied to the escapement 108 from a supply track or line 110 communicating with a vibratory bowl 112 of a design known in the art. The studs 18 are placed in the bowl and by a vibratory motion, are oriented and moved up an inclined track and into the supply line 110. In order to orient the studs 18 in the bowl 112, into which they are placed randomly, the truncated conical margin 28 of the stud 18 in FIG. 3 is provided. Without this special configuration, the studs could not be readily oriented, at least by automatic supply systems heretofore commonly used in the art.

Figure 4:
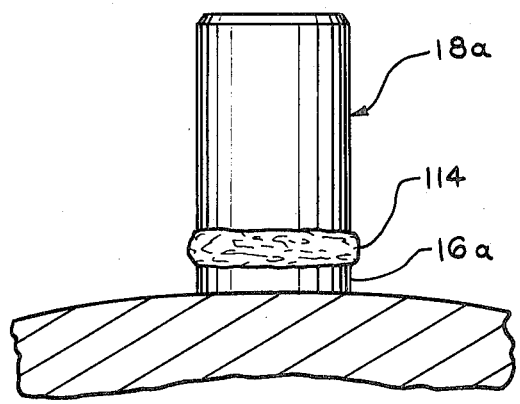
FIG. 4 is a somewhat schematic view in elevation on a smaller scale, of the components shown in FIG. 3, after the welding is completed.

The final welded stud and nubbin are shown somewhat schematically in FIG. 4. The stud in this instance is designated 18a and the nubbin designated 16a. A bead of weld metal 114 joins the two, this weld metal being formed from the outer end portion of the nubbin 16 and the adjacent portion, perhaps to a depth of one-eighth inch, of the weldable end of the stud 18.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A boiler tube stud to be welded to a nubbin on a boiler tube, said stud comprising an elongate metal body, said body being of cylindrical shape and of substantially uniform cross section throughout most of its length, said body having a main concave recess centrally located in one end thereof and having a diameter which is more than one-half and less than three-fourths the diameter of said stud body to provide a margin between the recess and the outer surface of said body, said main recess having a flux recess centrally located therein, and a body of flux centrally located in said flux recess, said body of flux filling said flux recess and extending outwardly therefrom, with the extremity of the flux body being within said main recess to the rear of said margin, whereby an outer end of the nubbin can be received in said main recess, the maximum dimension across said flux body being less than the maximum dimension across said main recess.

2. A boiler tube stud according to claim 1 characterized by said margin being of a substantially truncated conical shape, sloping rearwardly from near the peripheral edge of said main recess to the outer surface of said stud body.

3. A boiler tube stud according to claim 1 characterized by said margin sloping at an angle from 20° to 35° with respect to a plane perpendicular to the longitudinal extent of said stud.

4. A method of welding a boiler tube stud to a boiler tube, said method comprising removing refractory and other contaminants from the surface of the boiler tube, forming a cylindrical stud with a recess in one end thereof, providing a body of flux centrally in said recess, positioning said stud with the recessed end in contact with a nubbin on the boiler tube with the nubbin projecting into said recess, and welding the stud to the nubbin.

5. A method according to claim 4 characterized further by welding the stud to the nubbin by a drawn-arc, end-welding technique.

* * * * *